United States Patent
Bossard

(10) Patent No.: US 8,720,620 B1
(45) Date of Patent: May 13, 2014

(54) FUEL CELL POWERED VEHICLE THAT GENERATES PURIFIED HYDROGEN GAS ON-DEMAND FROM TRADITIONAL LIQUID FUELS

(75) Inventor: Peter R. Bossard, Ivyland, PA (US)

(73) Assignee: Power & Energy, Inc., Ivyland, PA (US)

( * ) Notice: Subject to any disclaimer, the term of this patent is extended or adjusted under 35 U.S.C. 154(b) by 1262 days.

(21) Appl. No.: 12/167,057

(22) Filed: Jul. 2, 2008

(51) Int. Cl.
*B60L 11/18* (2006.01)

(52) U.S. Cl.
USPC .............. 180/65.31; 180/65.1; 180/65.21; 429/9

(58) Field of Classification Search
USPC ........... 180/65.1, 65.21, 65.31; 903/903, 904, 903/907, 908, 944; 429/9, 17, 19, 20
See application file for complete search history.

(56) References Cited

U.S. PATENT DOCUMENTS

| | | | |
|---|---|---|---|
| 6,210,821 B1 * | 4/2001 | Lesieur et al. | 429/412 |
| 2001/0038934 A1 * | 11/2001 | Berlowitz et al. | 429/19 |
| 2002/0015870 A1 * | 2/2002 | Cownden et al. | 429/19 |
| 2002/0162693 A1 * | 11/2002 | Mizuno et al. | 180/65.1 |
| 2003/0148155 A1 * | 8/2003 | Matthews et al. | 429/26 |
| 2005/0091922 A1 * | 5/2005 | Goebel et al. | 48/198.7 |
| 2005/0093287 A1 * | 5/2005 | Kondo | 280/834 |
| 2006/0134471 A1 * | 6/2006 | Gerard | 429/13 |

* cited by examiner

*Primary Examiner* — J. Allen Shriver, II
*Assistant Examiner* — Bryan Evans
(74) *Attorney, Agent, or Firm* — LaMorte & Associates P.C.

(57) ABSTRACT

An automobile assembly and a method of producing hydrogen gas within an automobile assembly. An automobile is provided that contains a fuel cell. The fuel cell produces electricity from purified hydrogen gas. The vehicle also has a standard fuel tank that holds liquid fuel and a water tank that holds water. A fuel reformation system is carried by the vehicle. The fuel reformation system reacts water with liquid fuel to produce hydrogen gas and exhaust gases. The hydrogen gas is separated and is supplied to the fuel cell as needed by the fuel cell. The fuel cell produces electricity that drives electric motors to power the wheel of the vehicle. The vehicle, therefore, uses traditional liquid fuel to produce the hydrogen needed to operate the fuel cell and power an otherwise electric vehicle.

16 Claims, 3 Drawing Sheets

FUEL CELL POWERED VEHICLE THAT GENERATES PURIFIED HYDROGEN GAS ON-DEMAND FROM TRADITIONAL LIQUID FUELS

BACKGROUND OF THE INVENTION

1. Field of the Invention

In general, the present invention relates to motor vehicles that are powered by fuel cells. More particularly, the present invention relates to systems used to supply hydrogen gas to the fuel cell during the operation of the motor vehicle.

2. Prior Art Description

Due to the concerns of green house gas emissions and fuel costs, automobile manufacturers have been attempting to create automobiles that run on alternate fuel sources. For example, some city buses have been manufactured that burn hydrogen gas instead of gasoline. When hydrogen gas burns, it creates only water, thereby eliminating pollution from the bus engines.

One of the largest problems associated with vehicles that burn hydrogen gas is how to refuel those vehicles. Hydrogen has must be kept in storage tanks at relatively high pressures. Accordingly, in order to support a vehicle that burns hydrogen, large volumes of hydrogen must be produced at an industrial source. The hydrogen gas must then be trucked to a refill station in specialized tanker trucks. Once at the refill station, the hydrogen gas must be transferred under pressure to the storage tanks at the refill station. The refill station then holds the hydrogen until needed by the vehicles. Hydrogen gas is highly reactive. Accordingly, all transportation tanks, storage tanks and transfer pipelines must be made of high strength, non-reactive materials, such as stainless steel.

The infrastructure needed to supply hydrogen is complex and costly. If even a small percentage of vehicles ran on hydrogen, the U.S. industrial capacity to produce hydrogen would soon be exhausted. Furthermore, there would not be enough pressurized tanker trucks and freight cars available to distribute the required hydrogen. It is primarily due to these supply infrastructure problems that hydrogen fueled vehicles have been limited to specialized applications, such as city buses, where the expense of the system is subsidized by the government.

Electric vehicles are yet another approach to reducing pollution and fuel consumption by vehicles. Some electric automobiles are powered solely by rechargeable batteries. The rechargeable batteries are recharged from an external power source when the automobile is not in use. Such electric cars have many disadvantages that limit their appeal to the general public. For example, such electric cars require large expensive batteries that contain highly toxic materials. Furthermore, such electric cars must be plugged into an external power source and recharged. Accordingly, the vehicle is not always available for use.

In an attempt to make electric automobiles more practical, hybrid vehicles have been created. Hybrid vehicles contain an internal combustion engine that both powers the vehicle and recharges rechargeable batteries. During certain driving situations, the hybrid vehicle powers itself using electricity stored in the batteries.

Although hybrid vehicles have better gas mileage than do traditional gasoline engine vehicles, hybrid vehicle still burn hydrocarbon fuel inefficiently. Accordingly, such vehicles still add significantly to air pollution and global warming.

It has long been desired to produce a vehicle that runs on electricity yet does not require recharging or a back-up internal combustion engine. One of the most practical ways to fulfill this need is to power the vehicle with a proton exchange membrane (PEM) fuel cell. A PEM fuel cell creates electricity from hydrogen gas. The electricity is used to run electric motors that drive the wheels of the vehicle. A PEM fuel cell creates no greenhouse gases. However, a PEM fuel cell requires the use of ultrapure hydrogen gas. Ultrapure hydrogen gas is hydrogen gas that is at least 99.999% pure. If such pure hydrogen gas is not used, the PEM fuel cell will quickly fail. It will therefore be understood that if a vehicle runs on a PEM fuel cell, that vehicle has the same refueling problems as does a vehicle that burns hydrogen, plus the added complication that the hydrogen must be ultrapure. Accordingly, until now, vehicles that have PEM fuel cells have been more expensive and less practical than even vehicles that burn hydrogen.

In order for a vehicle with a PEM fuel cell to become practical, a need exists for providing ultrapure hydrogen to the vehicle in a cost efficient manner. This need is met by the present invention as described and claimed below.

SUMMARY OF THE INVENTION

The present invention is an automobile assembly and a method of producing hydrogen gas within an automobile assembly. A vehicle is provided that contains a fuel cell. The fuel cell produces electricity from purified hydrogen gas. The vehicle also has a standard fuel tank that holds liquid fuel at ambient pressure. The liquid fuel is hydrocarbon based, such as gasoline, diesel fuel or ethanol. The vehicle also contains a water tank for holding a volume of water. A fuel reformation system is carried by the vehicle. The fuel reformation system reacts water from the water tank with liquid fuel from the fuel tank to produce hydrogen gas and exhaust gases. The hydrogen gas is separated and is supplied to the fuel cell as needed by the fuel cell.

The fuel cell produces electricity that drives electric motors to power the wheel of the vehicle. The vehicle, therefore, uses traditional liquid fuel to produce the hydrogen needed to operate the fuel cell and power an otherwise electric vehicle. Far less liquid fuel is consumed to power the vehicle than otherwise would be consumed by a traditional internal combustion engine.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Figure 1:
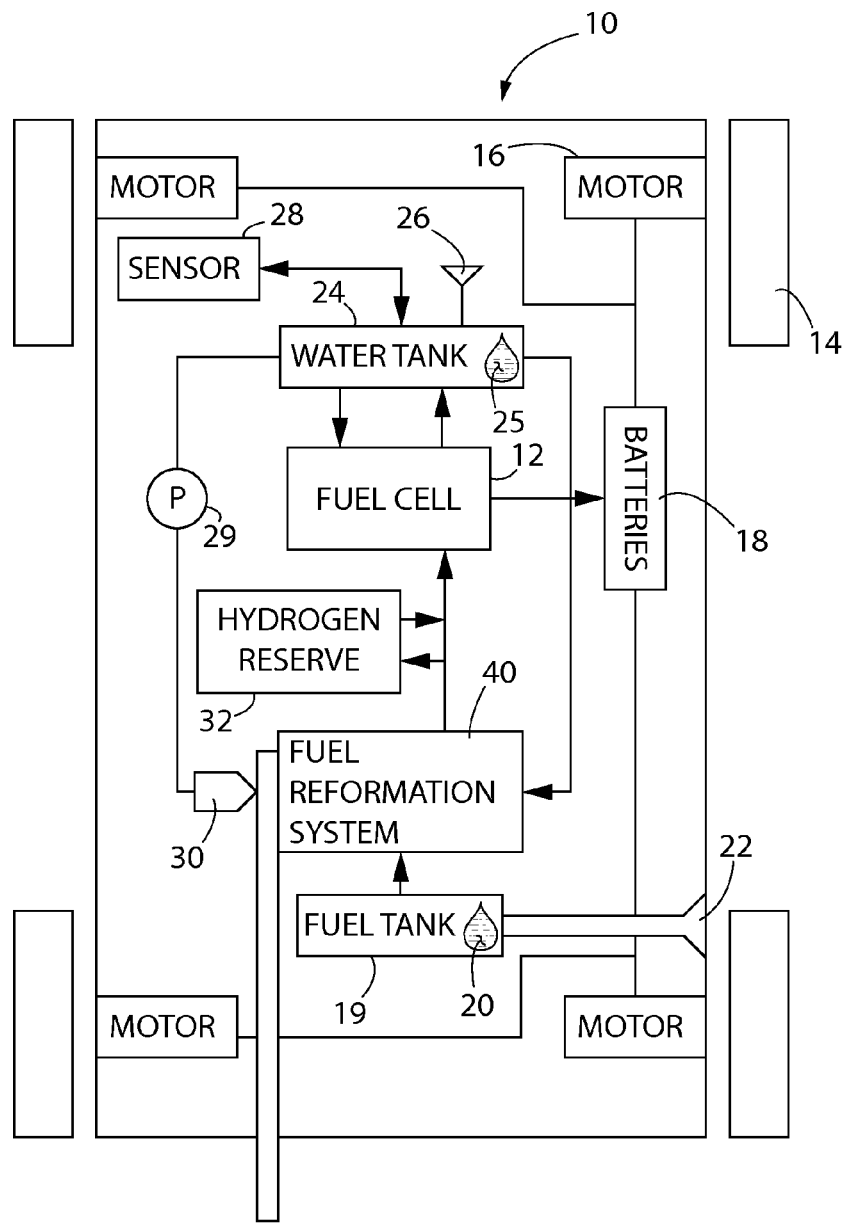
FIG. 1 is a schematic of a vehicle in accordance with the present invention.

Referring to FIG. 1, a schematic of a motor vehicle 10 is shown that is powered by a PEM fuel cell 12. The vehicle 10 is an automobile and has four wheels 14. The wheels 14 are driven by electric motors 16. The power needed to operate the electric motors 16 is provided by the PEM fuel cell 12 and/or storage batteries 18 that are recharged by the PEM fuel cell 12. As will be later explained, the storage batteries 18 need not be large since they only need to store the electricity required to operate the electric motors 16 for less than ten minutes.

The vehicle 10 has a traditional fuel tank 19 that holds liquid fuel 20, such as gasoline, diesel fuel, or ethanol. The fuel tank 19 is at ambient pressure and can be filled through a fill port 22 in a traditional manner at any existing gas station.

In addition to a fuel tank 19, the vehicle 10 also includes a water tank 24. As will later be explained, the water tank 24 is automatically refilled by the operation of the PEM fuel cell 12. However, in the event that the water tank 24 runs low on water 25, the water tank 24 is provided with a refill port 26 that is preferably located under the hood of the vehicle 10. This will prevent someone from inadvertently mistaking the water tank refill port 26 with the gas tank fill port 22.

Since the operation of the PEM fuel cell 12 generates water, it is possible for too much water to be present. Accordingly, the vehicle 10 also contains a water drain system. The water drain system includes a sensor 28 for detecting the volume of water in the water tank 24. Should too much water be present, a pump 29 moves some of the water to an injector 30. Under conditions that will be later described, the injector 30 injects the water at a controlled rate into the hot exhaust gases of the vehicle 10. Surplus water is therefore vented as vapor in the vehicle exhaust. This prevents the expelled water from puddling under the vehicle.

The PEM fuel cell 12 is fueled by ultrapure hydrogen. The ultrapure hydrogen is generated within the confines of the vehicle 10 by a fuel reformation system 40. The fuel reformation system 40 utilizes the liquid fuel 20 in the fuel tank 19 and the water 25 in the water tank 24 to create a water gas shift reaction. The water gas shift reaction produces hydrogen gas. The hydrogen gas is then separated from the other gases and is utilized to power the PEM fuel cell 12. It will therefore be understood that the fuel reformation system 40 generates hydrogen gas on demand for use by the PEM fuel cell 12. A small hydrogen reserve 32 is provided to store some hydrogen gas for the rare instances where the needs of the PEM fuel cell 12 cannot be immediately synchronized with the output of the fuel reformation system 40.

Since the vehicle 10 refuels by filling the fuel tank 19 with traditional liquid fuel at ordinary gas stations, it will be understood that no infrastructure changes are required to manufacture, store and transport hydrogen gas to a refueling station. The vehicle can therefore be practically driven and refueled without any changes to the existing systems for supplying liquid fuel to traditional gas stations. Furthermore, as will be explained, hydrogen gas can be produced from many different types of liquid fuel, such as low octane gasoline, high-octane gasoline, diesel fuel, and ethanol. Accordingly, the owner of the vehicle can fill the gas tank with whatever fuel is currently at the lowest cost.

Figure 2:
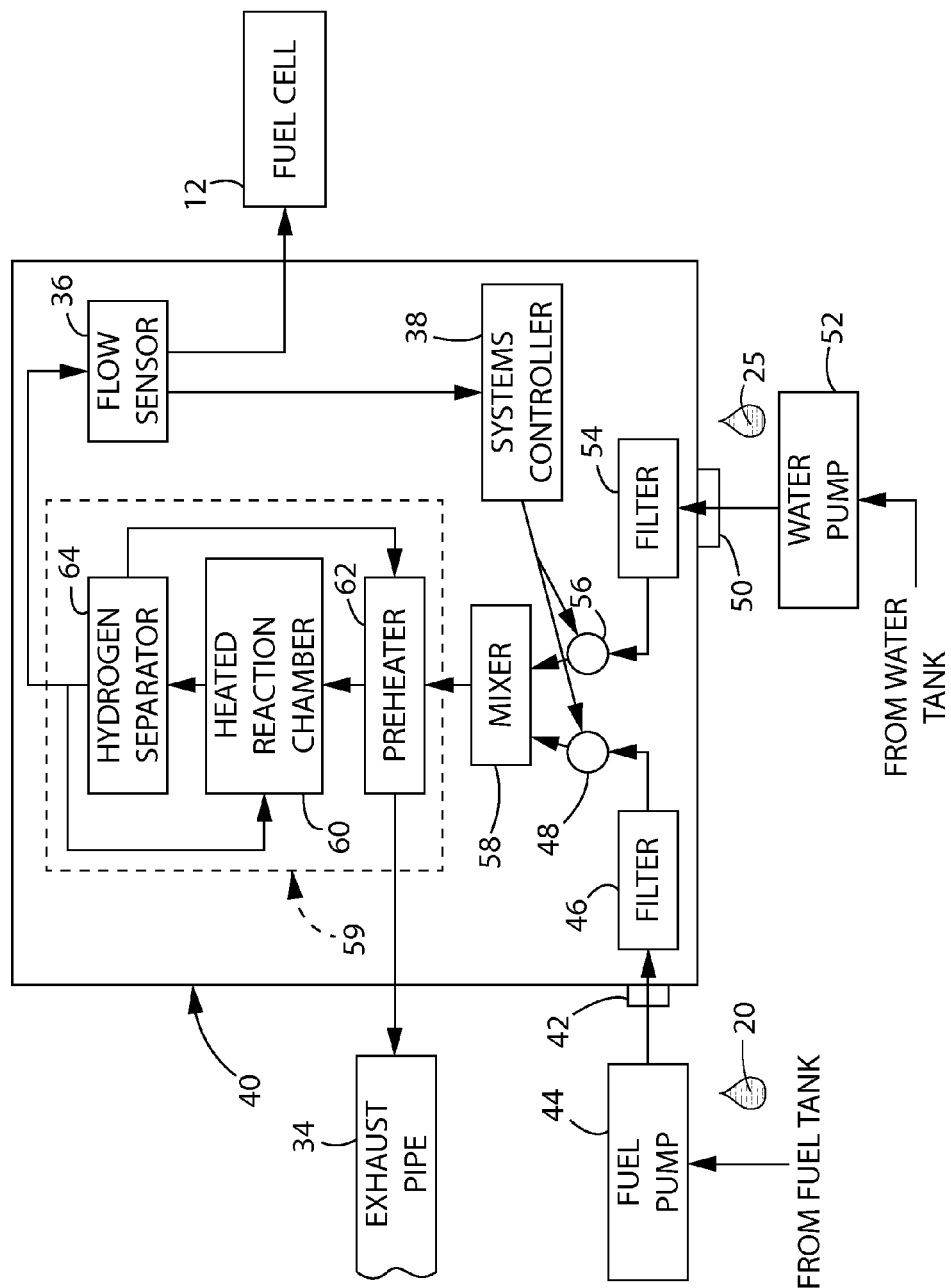
FIG. 2 is a schematic illustrating the operation of the fuel reformation system and hydrogen gas flow used within the vehicle.

Referring to FIG. 2 in conjunction with FIG. 1, it can be seen that the fuel reformation system 40 has two inputs. The first input is the liquid fuel input 42. A fuel pump 44 is provided that pumps liquid fuel 20 out of the fuel tank 19. The liquid fuel 20 is passed through a filter 46 to remove any particulate contaminants. A controllable flow valve 48 is provided to control the amount of liquid fuel 20 that is drawn out of the fuel tank 19.

The second input is a water input 50. The water input 50 connects to the water tank 24. A water pump 52 is used to move the water 25. A filter 54 is supplied to remove particulate contaminates from the water 25. A second controllable flow valve 56 is provided to measure the amount of water that is utilized by the fuel reformation system 40.

The water 25 and the liquid fuel 20 are fed into a mixer 58. The mixer 58 combines the liquid fuel and the water in ratios determined by the settings of the first and second controllable flow valves 48, 56. The water 25 and liquid fuel 20 combine to form an emulsion. The emulsion is fed into a fuel processing cell 59. The fuel processing cell 59 creates a water gas shift reaction to occur.

The primary hydrocarbon contained within the liquid fuel 20 is represented by the formulation C(n)H(m) where (n) is the number of carbon atoms in the hydrocarbon and (m) is the number of hydrogen atoms in the hydrocarbon. For pure hydrocarbons, such as propane or methane, the hydrocarbon formulation is C(n)H(n+2).

The water/fuel emulsion is heated in a fuel processing cell 59. An endothermic reaction occurs between 600° C. and 900° C., wherein the hydrocarbon fuel and water are converted into Hydrogen ($H_2$), carbon monoxide (CO), methane ($CH_4$), carbon dioxide ($CO_2$) and water ($H_2O$). For example, assume that the hydrocarbon fuel being used is diesel fuel. The primary hydrocarbon in diesel fuel is $C_8H_{18}$. A typical heat cracking reaction for an emulsion containing water and such a hydrocarbon fuel is shown by Equation 1 below:

$$C_nH_{2n+2} + H_2O = CO_2 + CO = CH_4 + H_2 + H_2O \qquad \text{Equation 1}$$
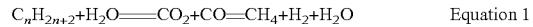

The useful chemical energy in the resultant gases is contained in the $H_2$, CO and $CH_4$. The chemical energy in these three resultant gases contains the chemical energy that was originally in the hydrocarbon fuel, plus some of the endothermic energy that was used to heat the fuel processing cell 59.

After the hydrocarbon is cracked, the resultant gases of $H_2$, $CH_4$, CO and $CO_2$ become part of the water gas shift reaction. Once the water gas shift reaction is induced, the CO and the $CH_4$ present in the resultant gases react with the water ($H_2O$). The CO and the $H_2O$ react as follows:

$$CO + H_2O = CO_2 + H_2 \qquad \text{Equation 2}$$

The $CH_4$ reacts with $H_2O$ as follows:

$$CH_4 + 2H_2O = CO_2 + 4H_2 \qquad \text{Equation 3}$$

When taken in sum, the combined hydrocarbon cracking reaction and water gas shift reaction can be expressed by Equation 4 below.

$$C(n)H(m) + 2(n)H_2O \rightarrow (n)CO_2 + [2(n) + (m/2)]H_2 \qquad \text{Equation 4}$$
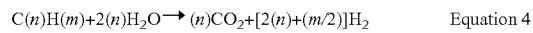

It will be understood that surplus water ($H_2O$) can be added to the reaction of Equation 4. The excess water helps in the reaction. However, excess water entered into the reaction is retrieved as excess water from the reaction and does not result in any further production of hydrogen gas beyond the equilibrium represented by Equation 4.

As an example, real numbers are herein applied to Equation 4. Referencing Equation 4, again assume the primary hydrocarbon in the hydrocarbon fuel is $C_8H_{18}$, such as the case with diesel fuel. Using Equation 4, the following reaction occurs.

$$C_8H_{18} + 16H_2O \rightarrow 8CO_2 + 25H_2$$
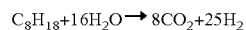

It can therefore be seen that by combining the hydrocarbon fuel with water vapor in the heated reaction chamber 60, a hydrocarbon containing only eighteen hydrogen atoms (H) results in reactant gases that include 25 free molecules of hydrogen gas ($H_2$).

In the illustrated schematic, the fuel processing cell 59 has three different stages that are represented by the three separate blocks in FIG. 2. Those three stages occur in a preheater 62, a heated reaction chamber 60, and the hydrogen separator 64. Although these three stages are shown as occurring in three separate components, it should be understood that the three components can be integrated into a single fuel processing cell design. Appropriate fuel processing cells are manufactured by Power+Energy, Inc. of Ivyland, Pa. Designs for fuel processing cells are shown in co-pending U.S. patent application Ser. No. 11/341,541, entitled System And Method For Processing Fuel For Use By A Fuel Cell Using A Microchannel Catalytic Hydrogen Separator; and U.S. patent application Ser. No. 11/097,535, entitled System And Method For Efficiently Separating Hydrogen Gas From A Mixed Gas Source, the disclosures of which are incorporated into this specification by reference.

In the preheater 62, the emulsion of water and liquid fuel is vaporized. In the reaction chamber 60, the vaporized emulsion is heated to a reaction temperature that induces the water gas shift reaction expressed previously by Equation 4. The hydrogen separator 64 separates hydrogen from the resultant gases on the left side of Equation 1. The gases other than hydrogen are vented to an exhaust pipe 34, after first being used to heat the preheater 62.

The hydrogen gas removed by the hydrogen separator 64 is ultrapure and ready for use. A small quantity of the hydrogen gas is tapped for use in heating the reaction chamber 60. The remainder of the hydrogen is available for use by the PEM fuel cell 12.

In FIG. 2, it should also be noted that a flow sensor 36 is provided that senses the amount of hydrogen being produced. Different types of liquid fuel require different amounts of water in the emulsion to optimize the water gas shift reaction. The flow sensor 36 is coupled to a systems controller 38. Likewise, the flow valve 48 for the liquid fuel 20 and the flow valve 56 for the water 25 are also connected to the systems controller 38. The systems controller 38 monitors the hydrogen output and optimizes the fuel-to-water ratio in order to maximize the hydrogen output. This provides the overall system with great flexibility in determining the type of liquid fuel that will be used to produce hydrogen.

Figure 3:
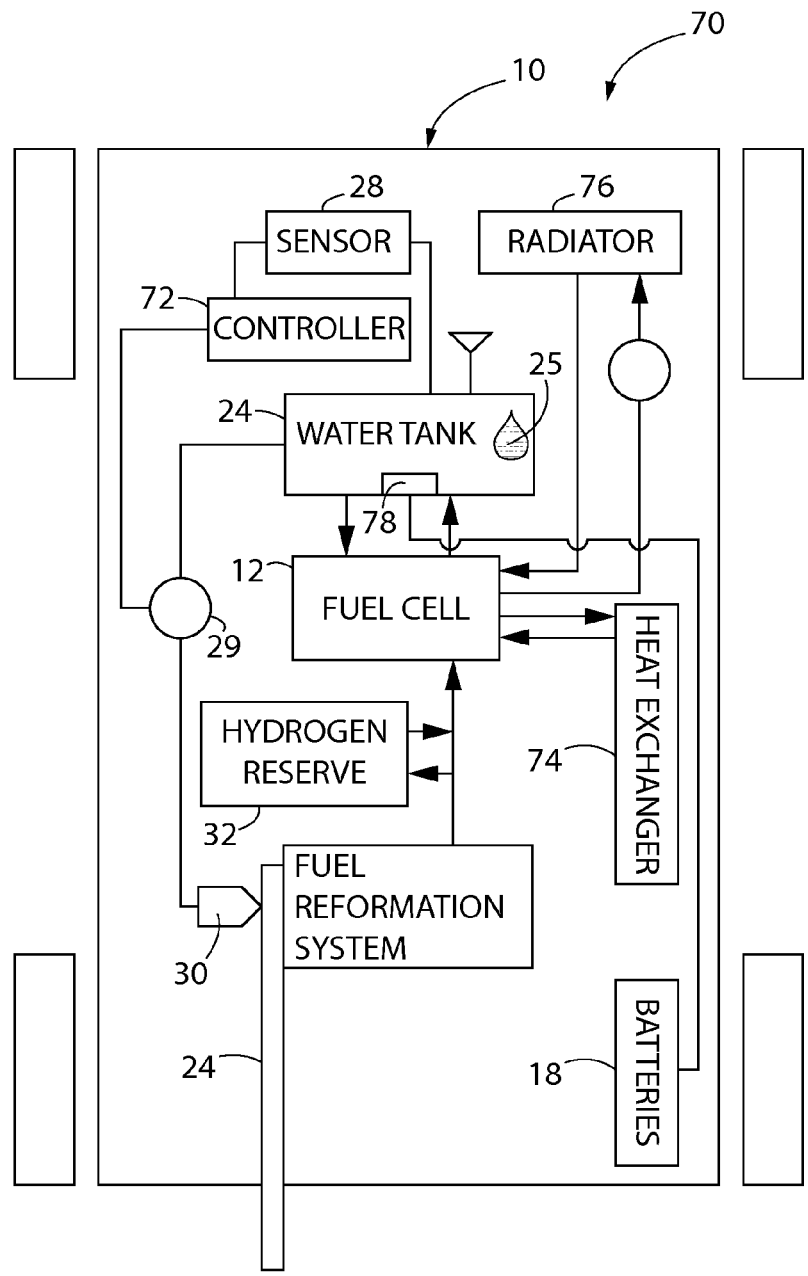
FIG. 3 is a schematic of the water management system utilized by the vehicle.

Referring to FIG. 3 in conjunction with FIG. 2, the water management system 70 for the vehicle 10 is described. Water 25 is stored in the water tank 24. Water is consumed out of the water tank 24 by the fuel reformation system 40. However, as will be understood by a person skilled in the art, a PEM fuel cell 12 produces water as it converts hydrogen gas into electricity. The water produced by the PEM fuel cell 12 is fed into the water tank 24. The water supplied by the PEM fuel cell 12 is greater than the water consumed by the fuel reprocessing system 40. Accordingly, the water tank 24 becomes self-filling.

Should the water 25 in the water tank 24 become too high, the high water condition is detected by the water sensor 28. The sensor 28 is coupled to a controller 72. The controller 72 also receives inputs regarding the speed of the vehicle 10. If the controller 72 senses that the water level is too high and that the vehicle 10 is moving, the controller 72 operates a pump 29 and injector 30. The injector 30 pumps aerated water into the exhaust pipe 34 of the vehicle 10. The water vaporizes in the heat of the exhaust pipe 34 and is vented as steam. It is preferred that the water only be vented while the vehicle 10 is moving to prevent the water from condensing and puddling under the vehicle 10 when the vehicle 10 is parked.

The PEM fuel cell 12 operates at about 80 degrees Celsius. This heat is utilized by the environmental controls of the vehicle. The PEM fuel cell 12 heats a volume of coolant. The coolant can be water, antifreeze or a combination thereof. The coolant is heated by the PEM fuel cell 12 and is pumped to a heat exchanger 74 under the dashboard of the vehicle. The air is blown past the heat exchanger 74 and is used to heat and defrost the interior of the vehicle in a traditional manner.

In warm weather, the coolant of the PEM fuel cell 12 is cycled through a radiator 76. The radiator 76 is located in the front of the vehicle and is cooled by air as the vehicle travels. Water flowing through the radiator 76 is controlled by a thermostat valve 77, as is used in traditional automobiles.

In order for the PEM fuel cell 12 and the fuel reformation system 40 to operate correctly, these components must be heated to their operational temperatures. In the coldest weather, it may take several minutes for the PEM fuel cell 12 and the fuel reformation system 40 to achieve their operational temperatures without experiencing damage from thermal shock.

The fuel reformation system 40 does not produce hydrogen gas unless it is operating at proper temperature. Accordingly, while the components of the fuel reformation system 40 are cold, the PEM fuel cell 12 can begin to operate using hydrogen stored in the hydrogen reservoir 32. The supply of hydrogen need not be great but must be sufficient enough to operate the PEM fuel cell 12 for a few minutes while the components of the fuel reformation system 40 come to temperature.

If ambient temperatures are very cold and the vehicle is cold, it may take a minute or two for the PEM fuel cell 12 to begin to produce the electricity needed to fully power the vehicle. In such situations, the motors 16 that drive the wheels 14 would operate from the power of the storage batteries 18. Again, the storage batteries 18 need only power the vehicle 10 for a few minutes, while the PEM fuel cell 12 and the fuel deformation system 40 warm. Accordingly, the storage batteries 18 can be relatively small and lightweight.

In addition to providing cold start power, the storage batteries 18 perform a secondary function. Since the vehicle 10 requires water to operate, the water tank 24 must contain water 25. Water is subject to freezing should temperatures fall below zero degrees Celsius. Although the water tank 24 and various water lines can be well insulated, it may be desirable to provide a heating element 78 in the water tank 24 in cold climates. The heating element 78 would keep the water from freezing and would be powered by the storage batteries 18.

It will be understood that the embodiment of the present invention that is illustrated is merely exemplary and that a person skilled in the art can modify the exemplary embodiment in many ways using different but functionally equivalent components. For instance, there are many prior art designs for PEM fuel cells. Likewise, there are many prior art designs for hydrogen purifiers. Many such prior art designs can be adapted for use in the present invention. All such variations, modifications and alternate embodiments are intended to be included within the scope of the present invention as defined by the claims.

What is claimed is:
1. An automobile assembly, comprising:
a fuel cell that operates on hydrogen gas;
a fuel tank that holds liquid fuel at ambient pressure, wherein said liquid fuel is hydrocarbon based;
a water tank for holding water;
a reformation system that reacts said water from said water tank with said liquid fuel from said fuel tank to produce hydrogen gas and exhaust gases;
a hydrogen separator for separating said hydrogen gas from said exhaust gases to obtain purified hydrogen gas, wherein some of said purified hydrogen gas is supplied to said fuel cell and some of said purified hydrogen gas is burned to directly heat said reformation system;
wheels; and at least one electric motors for driving said wheels, wherein said electric motor is powered, at least in part, by said fuel cell.

2. The assembly according to claim 1, wherein said fuel cell produces water as a byproduct of operation and said water is recycled to said water tank.

3. The assembly according to claim 1, further including a system for venting water should said water in said water tank surpass a threshold level.

4. The assembly according to claim 3, wherein said system for venting water injects water into said exhaust gases.

5. The assembly according to claim 1, wherein said reformation system includes a heated reaction chamber for inducing a water gas shift reaction between said liquid fuel and said water, wherein said heated reaction chamber is directly heated by burning some of said purified hydrogen gas.

6. The assembly according to claim 5, wherein said reformation system further includes a preheater for vaporizing said liquid fuel and said water.

7. The assembly according to claim 6, wherein said preheater is heated, at least in part, by said exhaust gases.

8. The assembly according to claim 1, further including at least one storage battery, wherein said storage battery is charged, at least in part, by said fuel cell.

9. The assembly according to claim 1, wherein said at least one electric motor is powered by said storage battery when said fuel cell is non-operational.

10. The assembly according to claim 8, further including a heating element in said water tank that is powered by said at least one storage battery.

11. The assembly according to claim 1, further including a radiator and coolant that flows through said radiator, wherein said coolant cools said fuel cell to maintain said fuel cell at a predetermined operational temperature.

12. The assembly according to claim 1, further including a storage tank for holding a volume of hydrogen gas, wherein said storage tank is supplied by said hydrogen gas from said reformation system.

13. The assembly according to claim 12, wherein said storage tank supplies hydrogen gas to said fuel cell when said fuel reformation system is below a predetermined operational temperature.

14. In an electric vehicle powered by a fuel cell, a system for generating hydrogen gas on-demand within said vehicle for use by said fuel cell, said system comprising:
 a fuel tank containing liquid hydrocarbon fuel at ambient pressure;
 a water tank for holding water;
 a mixer for mixing said liquid hydrocarbon fuel and said water to form an emulsion;
 a preheater for vaporizing said emulsion into a vaporized emulsion;
 a reformation system that reacts said vaporized emulsion to produce hydrogen gas and exhaust gases;
 a hydrogen separator for separating said hydrogen gas from said exhaust gases, therein producing purified hydrogen gas, wherein said purified hydrogen gas is supplied to said fuel cell and said exhaust gases are utilized to heat said preheater.

15. The system according to claim 14, wherein said reformation system includes a heated reaction chamber for inducing a water gas shift reaction between said liquid hydrocarbon fuel and water, wherein said water gas shift reaction produces both said hydrogen gas and said exhaust gases.

16. The assembly according to claim 15, wherein said heated reaction chamber is heated by burning some of said purified hydrogen gas.

* * * * *